(12) United States Patent
Varbedian et al.

(10) Patent No.: US 12,244,569 B2
(45) Date of Patent: Mar. 4, 2025

(54) PER PARTICIPANT END-TO-END ENCRYPTED METADATA

(71) Applicant: Snap Inc., Santa Monica, CA (US)

(72) Inventors: Jason Varbedian, Seattle, WA (US);
Wade Spires, Santa Monica, CA (US);
Benjamin Ralph Hollis, Seattle, WA (US); Kyle Comer, San Francisco, CA (US); Bradley Baron, Seattle, WA (US); Samuel Young, Seattle, WA (US);
Aleksandr Zhang, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 318 days.

(21) Appl. No.: 17/446,360

(22) Filed: Aug. 30, 2021

(65) Prior Publication Data
US 2023/0067981 A1    Mar. 2, 2023

(51) Int. Cl.
*H04L 9/40* (2022.01)
(52) U.S. Cl.
CPC ...... *H04L 63/0414* (2013.01); *H04L 63/0435* (2013.01); *H04L 63/0876* (2013.01); *H04L 63/20* (2013.01)
(58) Field of Classification Search
CPC . H04L 63/0414; H04L 51/52; H04L 63/0435; H04L 63/0876; H04L 63/20; H04L 51/10
See application file for complete search history.

(56) References Cited

U.S. PATENT DOCUMENTS

| 9,213,855 | B1 | 12/2015 | Corrales et al. |
| 9,268,964 | B1 | 2/2016 | Schepis et al. |
| 10,491,574 | B1 * | 11/2019 | Jung ............ H04L 63/10 |

(Continued)

FOREIGN PATENT DOCUMENTS

| CN | 117882360 A | 4/2024 |
| WO | WO-2023034721 A1 | 3/2023 |

OTHER PUBLICATIONS

"International Application Serial No. PCT/US2022/075505, International Search Report mailed Dec. 2, 2022", 5 pgs.

(Continued)

*Primary Examiner* — Jason K Gee
*Assistant Examiner* — Brian William Avery
(74) *Attorney, Agent, or Firm* — Schwegman Lundberg & Woessner, P.A.

(57) ABSTRACT

Systems and methods are provided for sending a combined read and reaction message. The systems and methods perform operations comprising: accessing, by a messaging application, a conversation session comprising a plurality of messages exchanged between a plurality of client devices, the messaging application being associated with a first client device of the plurality of client devices; generating, by the messaging application, metadata associated with one or more of the plurality of messages; encrypting, by the messaging application, the metadata in accordance with an end-to-end encryption process to enable a second client device of the plurality of client devices to read the metadata and prevent the second client device from modifying the metadata; and transmitting, to a server, a packet comprising an encrypted message slot and a first metadata slot, the first metadata slot comprising the encrypted metadata.

20 Claims, 10 Drawing Sheets

(56) References Cited

U.S. PATENT DOCUMENTS

| | | | |
|---|---|---|---|
| 11,308,228 B1* | 4/2022 | Tian | G06Q 20/1235 |
| 2011/0238997 A1* | 9/2011 | Bellur | H04L 9/3242 |
| | | | 713/168 |
| 2015/0035999 A1 | 2/2015 | Shehane et al. | |
| 2017/0053122 A1 | 2/2017 | Rueger et al. | |
| 2017/0318445 A1* | 11/2017 | Kodaypak | H04W 4/90 |
| 2017/0352038 A1 | 12/2017 | Parekh et al. | |
| 2018/0341387 A1* | 11/2018 | Segal | H04L 51/04 |
| 2021/0067328 A1* | 3/2021 | Verheyen | H04L 9/0861 |
| 2021/0084137 A1* | 3/2021 | Kang | G06F 21/36 |
| 2023/0027035 A1* | 1/2023 | Gagliano | G06F 40/56 |
| 2023/0155743 A1* | 5/2023 | Xu | H04L 1/007 |
| | | | 370/328 |

OTHER PUBLICATIONS

"International Application Serial No. PCT/US2022/075505, Written Opinion mailed Dec. 2, 2022", 6 pgs.

"International Application Serial No. PCT/US2022/075505, International Preliminary Report on Patentability mailed Mar. 14, 2024", 7 pgs.

* cited by examiner

PER PARTICIPANT END-TO-END ENCRYPTED METADATA

TECHNICAL FIELD

The present disclosure generally relates to the technical field of social networks. In particular, the present examples are generally directed to message metadata encryption.

BACKGROUND

As the popularity of social networking grows, social networks are expanding their capabilities. To improve ease of use, social networks are integrating more and more functions such that a user may accomplish many or even most of their computer-based tasks within the social network itself.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
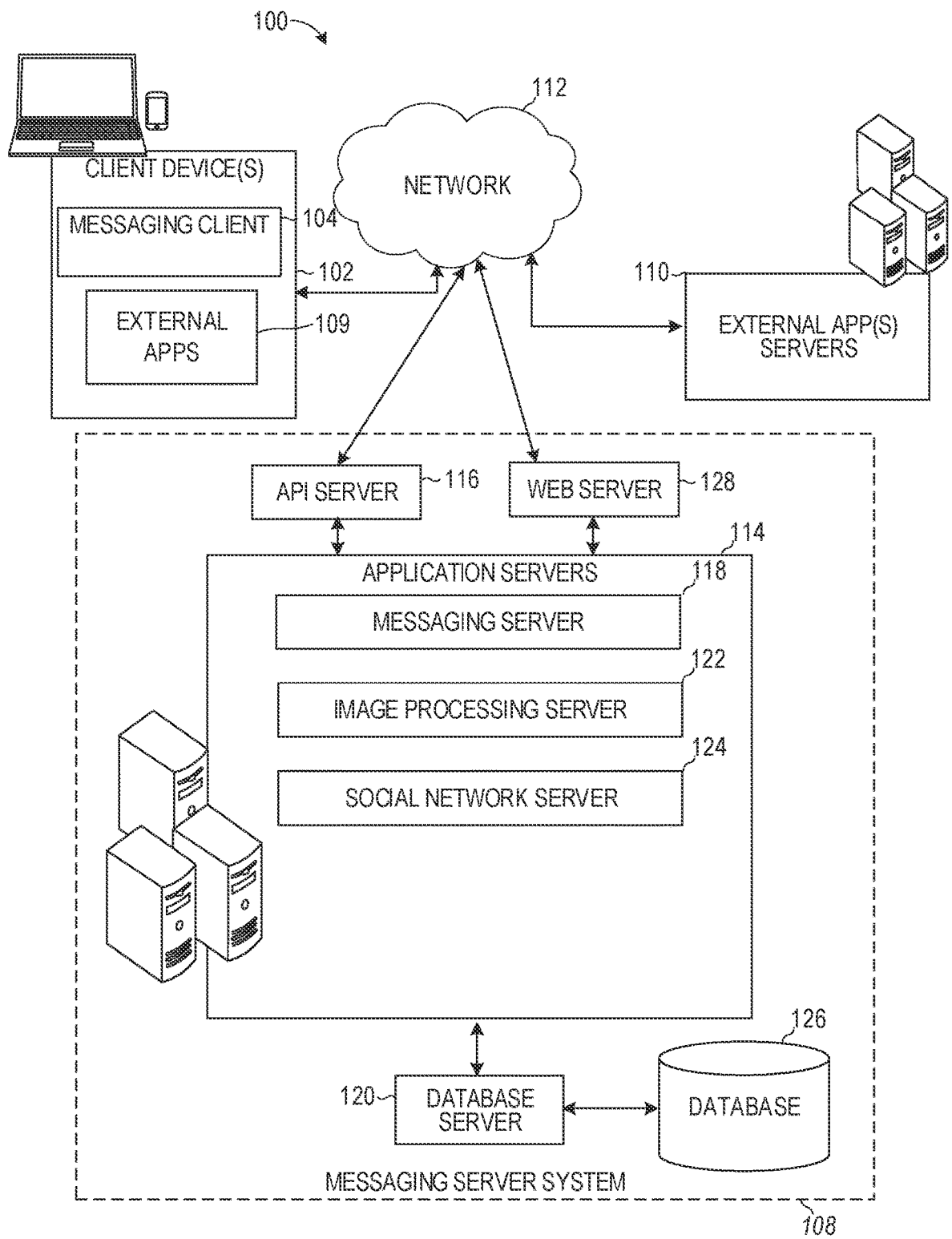
FIG. 1 is a diagram representing a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Often, users consume media content, and specifically videos, on their mobile device. Such media content is typically exchanged in chat, communication, or conversation sessions between users or participants. Sometimes users log on and log off a server that maintains the contents of the chat sessions. In order to ensure that the latest chat messages, that were exchanged in the chat session while the user device has been disconnected from the server, are presented to the user, a user device synchronizes with the server. Typically, the server will send the content of the messages that were exchanged while the user device was disconnected from the server. Some of these messages are associated with metadata, such as reactions, thumbs up indicators, graphical content, augmented reality items, and so forth.

In an effort to secure communications between client devices, various encryption schemes are applied to the messages. For example, in an end-to-end encryption scheme, each device encrypts the message generated by that device and provides a decryption key to the recipient device but not the server. Namely, end-to-end encryption (E2EE) is a system of communication where only the communicating users can read the messages. In principle, E2EE prevents potential eavesdroppers—including telecom providers, Internet providers, and even the provider of the communication service from being able to access the cryptographic keys used to decrypt the conversation. In this way, only the devices themselves that are involved in the communications are able to read the exchanged messages which prevents the server or intervening third party from compromising information contained in the messages.

While end-to-end encryption schemes generally work well for securing messages exchanged between end client devices, such schemes are not typically applied to metadata associated with the messages. For example, any reactions made by users to the messages are usually exchanged between the client devices in unencrypted form. Such information can sometimes be sensitive and can be compromised given the lack of security. Also, the metadata associated with the messages is usually sent separately from the messages themselves meaning that encrypting such metadata can cause more bandwidth on the network to be consumed and can introduce additional delays which adversely affects the overall user experience.

The disclosed examples improve the efficiency of using the electronic device by providing a system that efficiently encrypts both messages and metadata associated with the messages in a packet of data exchanged between client devices involved in a conversation session. According to the disclosed system, each user associated with a respective client device can be assigned a separate metadata slot in the conversation session. The client devices of the users can use metadata slots associated to the respective users to send encrypted metadata, such as reactions, thumbs up indicators, graphical content, augmented reality items, links to external app, indications of whether a client device saved, copied, printed, or deleted a message, and so forth. A packet of data is generated to include message content and encrypted metadata in the respectively assigned metadata slot. Recipients of the packet of data can decrypt the contents to read the messages and the metadata but are prevented from modifying the contents of the metadata slot. In some cases, the conversation session includes display regions associated with the respective slots into which the respectively assigned users can add metadata or other information. Any other user of the conversation session can access the region to read the contents contained in the display region of each other user but can only modify the contents of the metadata region associated with the particular user. This process enhances the overall security of communications including metadata exchanged between end client devices and reduces the amount of traffic exchanged over a network which improves the overall bandwidth and system efficiency.

For example, a messaging application can access a conversation session that includes a plurality of messages exchanged between a plurality of client devices, the messaging application being associated with a client device of the plurality of client devices. The messaging application generates metadata associated with one or more of the plurality of messages and encrypts the metadata in accordance with an end-to-end encryption process to enable a second client device of the plurality of client devices to read the metadata and prevent the second client device from modifying the metadata. The messaging application transmits, to a server, a packet that includes a message field and a metadata field, the metadata field including the encrypted metadata. The words "slots" and "fields" are used interchangeably throughout and should be understood to have the same functionality and meaning. The server can then send this packet to recipient devices involved in the conversation session, such as the second client device, to enable the recipient devices to read the message contents and the metadata but not modify the message contents and/or metadata. In one example, the metadata is encrypted using a private key associated with the first client device and the second client device is enabled to decrypt the metadata using a public key associated with the first client device.

In this way, the disclosed approach increases the efficiencies of the electronic device by reducing processing times and network bandwidth used to accomplish a task and increases the overall security of exchanging messages and metadata.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and external apps 109 (e.g., third-party applications). Each messaging client 104 is communicatively coupled to other instances of the messaging client 104 (e.g., hosted on respective client devices 102), a messaging server system 108 and external app(s) external resource servers 110 via a network 112 (e.g., the Internet). A messaging client 104 can also communicate with external apps 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, encrypted metadata associated with respective conversations, and live event information, as examples. Data exchanges within the messaging system 100 are invoked and controlled through functions available via user interfaces (UIs) of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages and reactions processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., encrypted metadata, commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages and metadata, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

In some examples, the client devices exchange such data in accordance with an end-to-end encryption scheme. In such cases, the messages and metadata are encrypted by the client devices in a way that enables only the client devices themselves to decrypt the messages and metadata and prevents the server from decrypting the messages and metadata. For example, in establishing a conversation session, the client devices can exchange private and public encryption key pairs. Namely, a first client device can send a first public key to other client devices involved in the conversation and can receive a public conversation key for the conversation session. A second client device can send a second public key to other client devices involved in the conversation and can receive the public conversation key for the conversation session. The public keys are not maintained on the messaging server 118. The first client device can apply a first private key associated with the first client device to encrypt the message and metadata that is assigned to a first metadata slot of the user associated with the first client device. The first client device can apply the same encryption to both the message contents and the metadata contents or can apply the conversation public key to encrypt the message contents and the private key to encrypt the metadata contents. The first client device can then generate a data packet that includes the encrypted message and metadata contents and optionally encrypt the data packet. The data packet is then transmitted via the messaging server 118 to a second client device.

The messaging server 118 provides the data packet that includes the encrypted message and the encrypted metadata slot to the second client device. In some cases, the messaging server 118 provides a data packet that includes multiple encrypted messages and multiple encrypted metadata slots each associated with a different client device to the second client device. The second client device can use public keys associated with each of the different client devices to decrypt the contents of the respective metadata slots. For example, the second client device can use the first public key associated with the first client device to decrypt the message and metadata that is in the first metadata slot. Namely, the second client device can access a header from the data packet that indicates a set of data corresponds to metadata associated with the first client device. In this case, the second client device obtains the first public key associated with the first client device and decrypts the set of data using the first public key.

In some examples, the second client device can decrypt the message contents using the private key that corresponds to the conversation public key and can use the first public key to decrypt the metadata contents separately from the message contents. This allows the second client device to read but not modify the metadata contents stored in the first metadata slot assigned to the user associated with the first client device. In a similar manner, the second client device can generate metadata (e.g., a reaction to one or more messages, an indication of saving, deleting, reading, copying, printing or otherwise acting upon a given message or metadata, an augmented reality element, an image, a video, a music file, an association of a link to an external app, or any combination thereof). The second client device can store the metadata in a second metadata slot of the conversation session assigned to the user associated with the second client device. The second metadata slot can be physically positioned in the same location as the first metadata slot but is assigned a different header that identifies the second metadata slot as being a second metadata slot. The second client device can encrypt the metadata stored into the second metadata slot using a second private key associated with the second client device. The second client device can send the encrypted second metadata slot in a packet together with encrypted message contents to the first client device via the messaging server 118. The first client device can then decrypt the second metadata slot using a second public key associated with the second client device. For example, the first client device can access a header from the packet that indicates a set of data corresponds to metadata associated with the second client device. In this case, the first client device obtains the second public key associated with the second client device and decrypts the set of data using the second public key. This allows the first client device to read but not modify the metadata contents stored in the second metadata slot assigned to the user associated with the second client device. Namely, the first client device cannot re-encrypt the metadata contents into the second metadata slot using the second public key as doing so will prevent any other client device that does not have the matching second private key from reading the metadata.

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
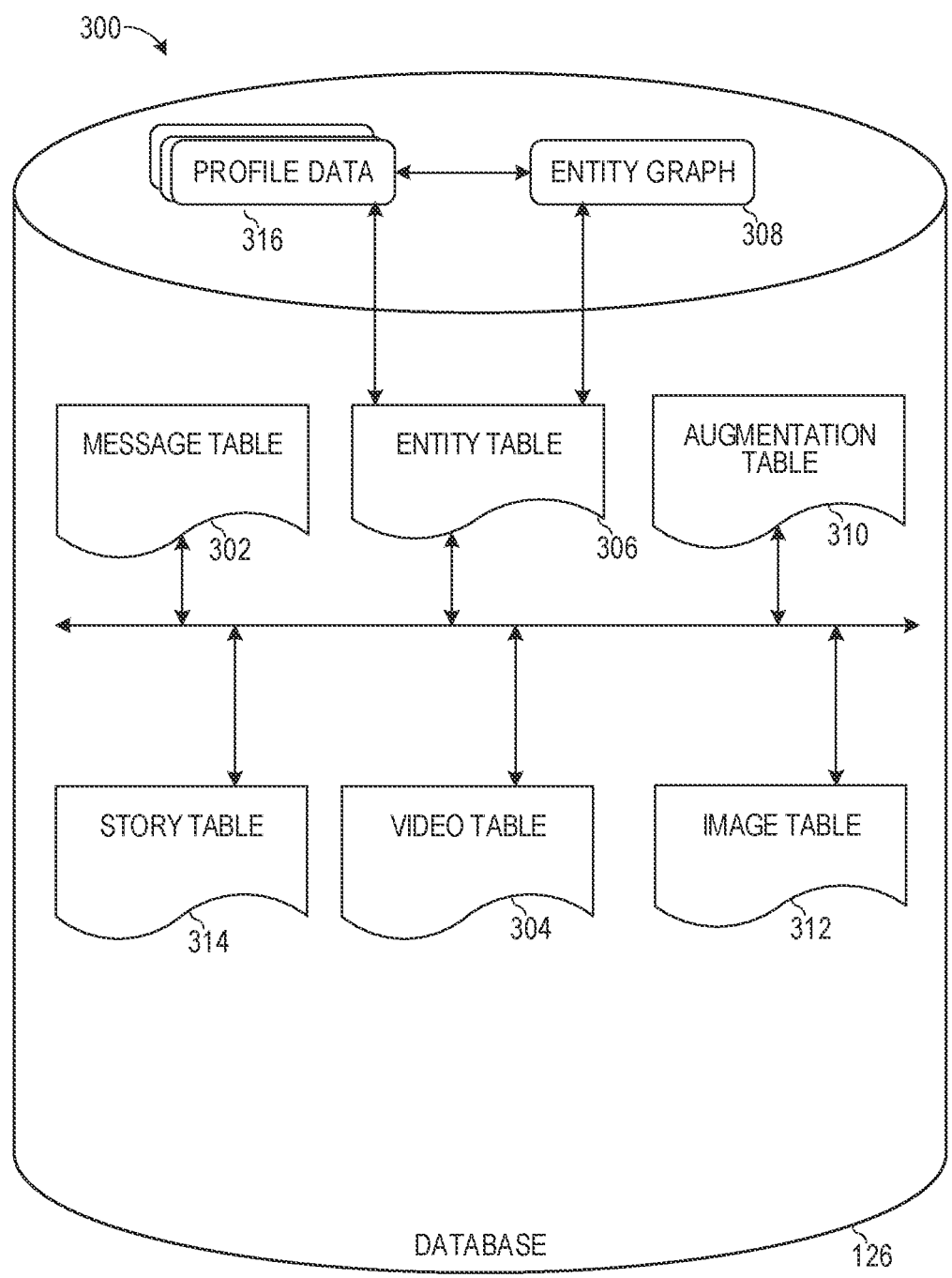
FIG. 3 is a diagram representing a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an external app 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external app(s) external resource servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally installed external app. In some cases, external apps 109 that are locally installed on the client device 102 can be launched independently of and separately from the messaging client 104, such as by selecting an icon, corresponding to the external app 109, on a home screen of the client device 102. Small-scale versions of such external apps can be launched or accessed via the messaging client 104 and, in some examples, no or limited portions of the small-scale external app can be accessed outside of the messaging client 104. The small-scale external app can be launched by the messaging client 104 receiving from an external app(s) server 110, a markup-language document associated with the small-scale external app and processing such a document.

In response to determining that the external resource is a locally installed external app 109, the messaging client 104 instructs the client device 102 to launch the external app 109 by executing locally stored code corresponding to the external app 109. In response to determining that the external resource is a web-based resource, the messaging client 104 communicates with the external app(s) external resource servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external apps 109 or applets) to a user to launch or access a given external resource. This list can be presented in a context-sensitive menu. For example, the icons representing different ones of the external app 109 (or applets) can vary based on how the menu is launched by the user (e.g., from a conversation interface or from a non-conversation interface).

In some examples, the messaging client 104 can present a conversation session to a plurality of participants. The conversation session can include different regions, such as a first region for presenting messages exchanged between the plurality of participants. The conversation session can include a second region (e.g., a first metadata slot) for presenting or accessing metadata generated by and received from a first client device of a first participant. The conversation session can include a third region (e.g., a second metadata slot) for presenting or accessing metadata generated by and received from a second client device of a second participant. The metadata included in the second region can be encrypted by the first client device using a first private key and can be accessed or decrypted by any client device of any of the plurality of participants using a first public key that corresponds to the first private key. None of the plurality of participants except the first participant associated with the first client device can write, add, delete or modify the metadata included in the second region without having access to the first private key. The metadata included in the third region can be encrypted by the second client device using a second private key and can be accessed or decrypted by any client device of any of the plurality of participants using a second public key that corresponds to the second private key. None of the plurality of participants except the second participant associated with the second client device can write, add, delete or modify the metadata included in the third region without having access to the second private key. This allows each user to have a secure place in the conversation session to store metadata associated with the conversation and share such metadata with other participants in the conversation securely in an end-to-end encrypted manner.

System Architecture

Figure 2:
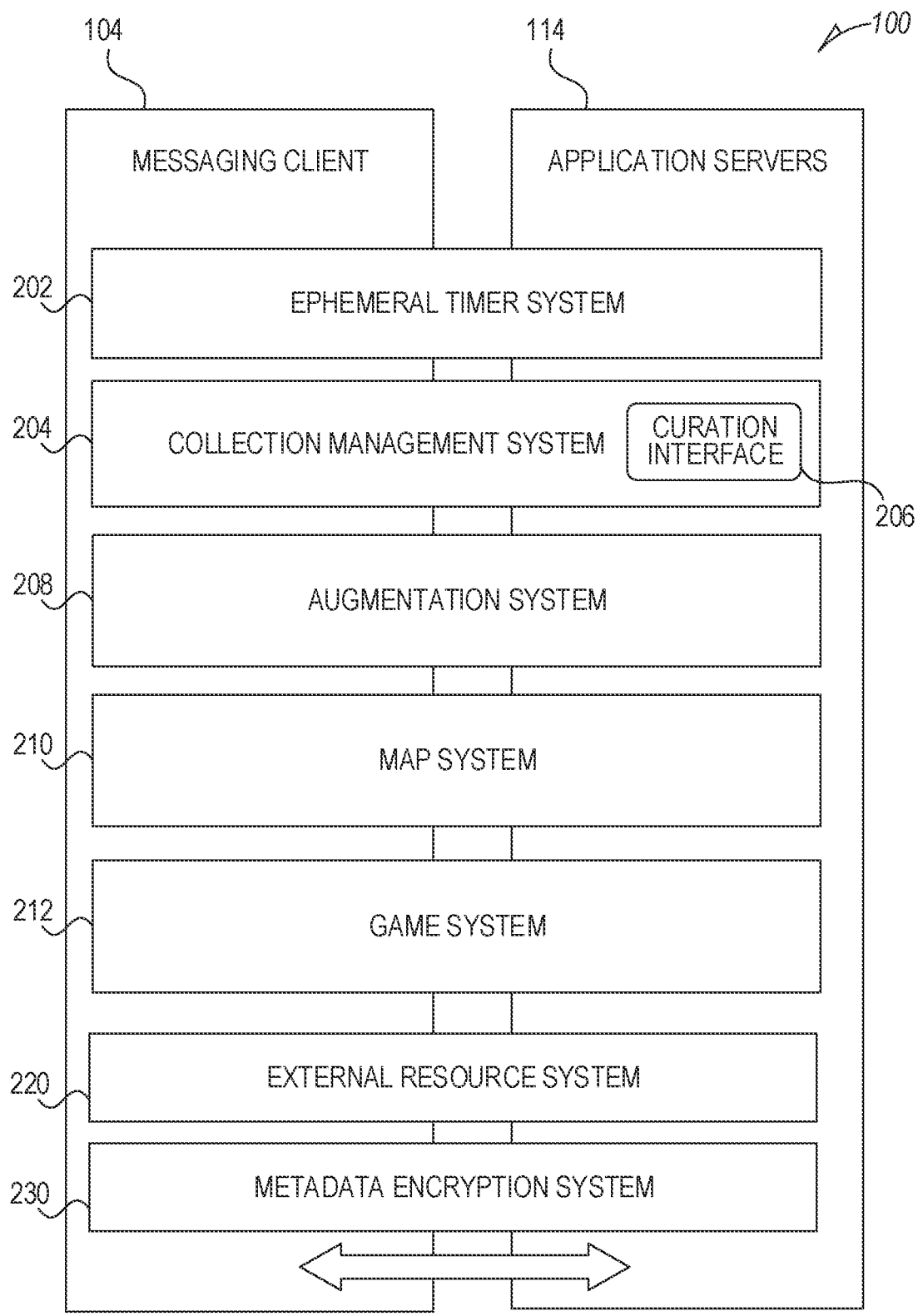
FIG. 2 is a diagram representing a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, an external resource system 220, and a metadata encryption system 230.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter or augmented reality item) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. The media overlay in some cases is referred to as an augmented reality item. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected, as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The augmentation system 208 allows users to create custom media overlays or augmented reality items. Such media overlays may include one or more different feature types. For example, the media overlays may include the facial tracking—based features in which one or more augmented reality items are modified based on movement of facial features detected in a received or captured image or video. As another example, the media overlays may include the audio clip—based features in which a sound clip or audio clip is associated with one or more augmented reality items that are presented in a received or captured image or video. As another example, the media overlays may include the gyroscopic or accelerometer-based features in which one or more augmented reality items are modified based on movement of the client device 102 on which a received or captured image or video is displayed. The custom media overlays can be shared with other users of the messaging application. The other users can select to launch or access the custom media overlays. In response, the features of the custom media overlays are retrieved and used to augment or modify one or more images or videos presented on client devices of the other users.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) external resource servers 110 to launch or access external resources. Each external resource (apps) server 110 hosts, for example, a markup language (e.g., HTML5)-based application or small-scale version of an external app (e.g., game, utility, payment, or ride-sharing application that is external to the messaging client 104). The messaging client 104 may launch a web-based resource (e.g., application) by accessing the HTML5 file from the external resource (apps) external resource servers 110 associated with the web-based resource. In certain examples, applications hosted by external resource external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external apps 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource external resource servers 110 and the messaging client 104. In certain examples, a Web View Java Script Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources used to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up a menu (e.g., animates a menu as surfacing from a bottom of the screen to a middle of or other portion of the screen) for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external apps (e.g., a third-party or external app 109) are provided with access to a first type of user data (e.g., only two-dimensional avatars of users with or without different avatar characteristics). As another example, external resources that include small-scale versions of external apps (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The metadata encryption system 230 manages secure and encrypted exchange of messages and metadata in a communication session or conversation involving a plurality of participants or users. As referred to herein, "metadata" includes indicates reactions, graphical elements, text, images, videos, emojis, links to external apps or websites, indications of actions (e.g., saving, deleting, copying, printing or otherwise acting upon a message or metadata in the conversation), augmented reality elements, or any other additional content that a given participant associates with one or more messages exchanged in a conversation involving multiple participants. In some implementations, the metadata references reactions, graphical elements, text, images, videos, emojis, links to external apps or websites, indications of actions (e.g., saving, deleting, copying, printing or otherwise acting upon a message or metadata in the conversation), augmented reality elements, or any other additional content that a given participant associates with one or more messages exchanged in a conversation involving multiple participants. In some implementations, the metadata includes or is the encrypted reactions, graphical elements, text, images, videos, emojis, links to external apps or websites, indications of actions (e.g., saving, deleting, copying, printing or otherwise acting upon a message or metadata in the conversation), augmented reality elements, or any other additional content that a given participant associates with one or more messages exchanged in a conversation involving multiple participants. For example, a given participant can select a message received in a conversation and add metadata, such as a reaction (e.g., a thumbs UP icon) to associated with the message. In response, metadata including a unique reaction identifier is generated and encrypted using a private key associated with the given participant. The encrypted metadata is sent together with messages generated by the participant to other users and is decrypted using a public key associated with the given participant to display the reaction to other participants of the conversation as part of the conversation interface. The metadata can be presented alongside the associated message and/or in a separate region from the messages dedicated to presenting metadata received from the participants in the conversation.

In an example, the metadata encryption system 230 establishes a communication session between a plurality of users or participants (e.g., a chat session in which multiple chat messages and/or metadata are exchanged). The messaging client 104 implemented on the client device 102 communicates with the metadata encryption system 230 to receive messages and metadata transmitted as part of the communication session. The messages and metadata are transmitted in encrypted form to allow only the client devices associated with the conversation to decrypt the contents of the messages and metadata preventing the server from decrypting the contents. Further details of the metadata encryption system 230 are provided in connection with FIG. 5.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user-name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then display on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information used to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of the object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
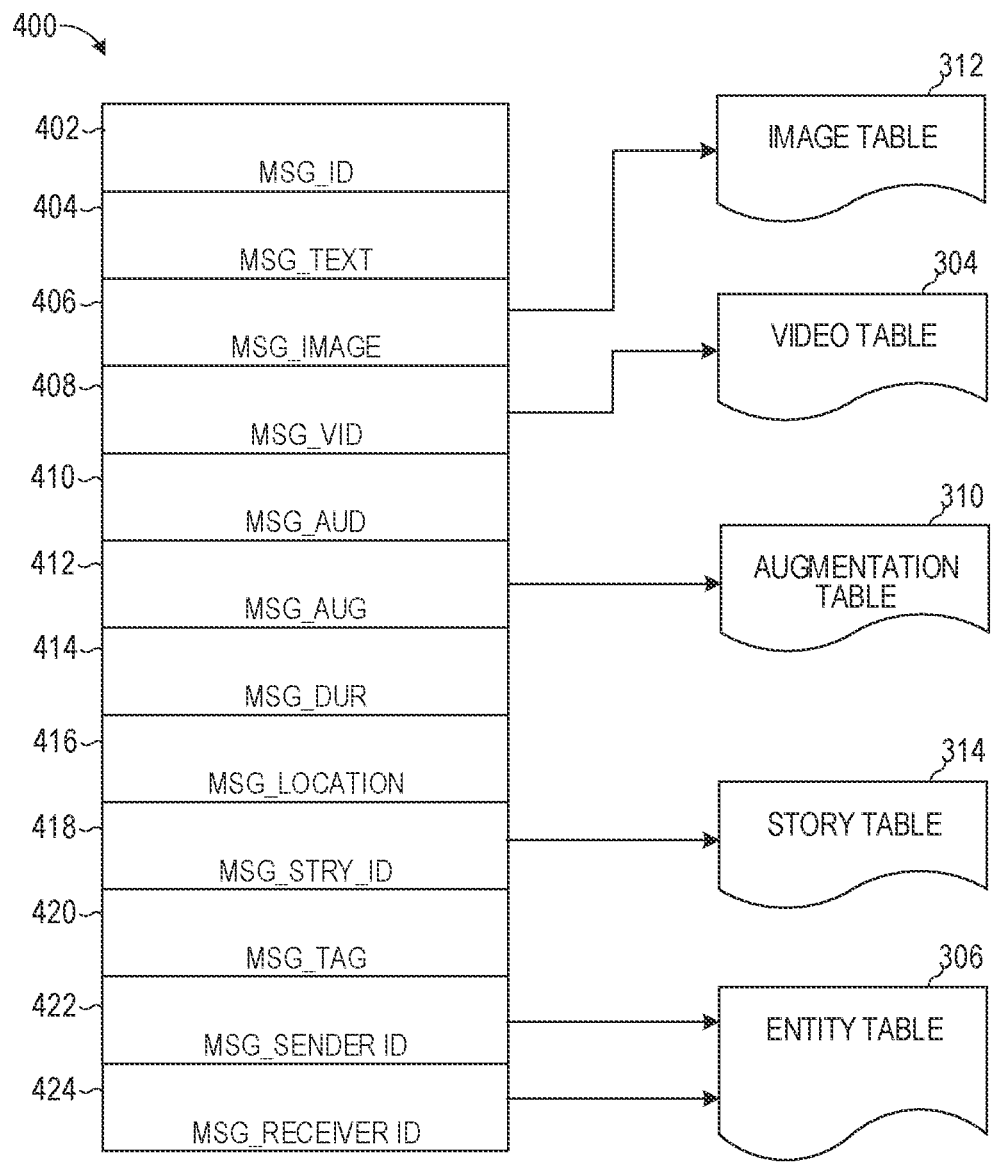
FIG. 4 is a diagram representing a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identities the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Metadata Encryption System

Figure 5:
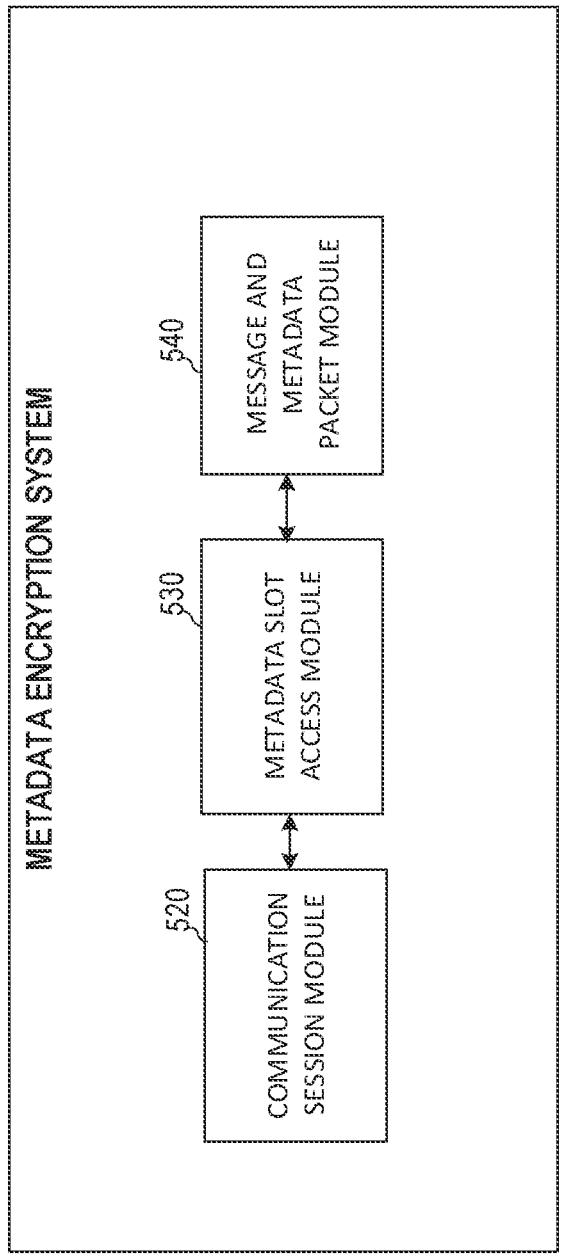
FIG. 5 illustrates a diagram of the metadata encryption system, in accordance with some examples.
Figure 6:
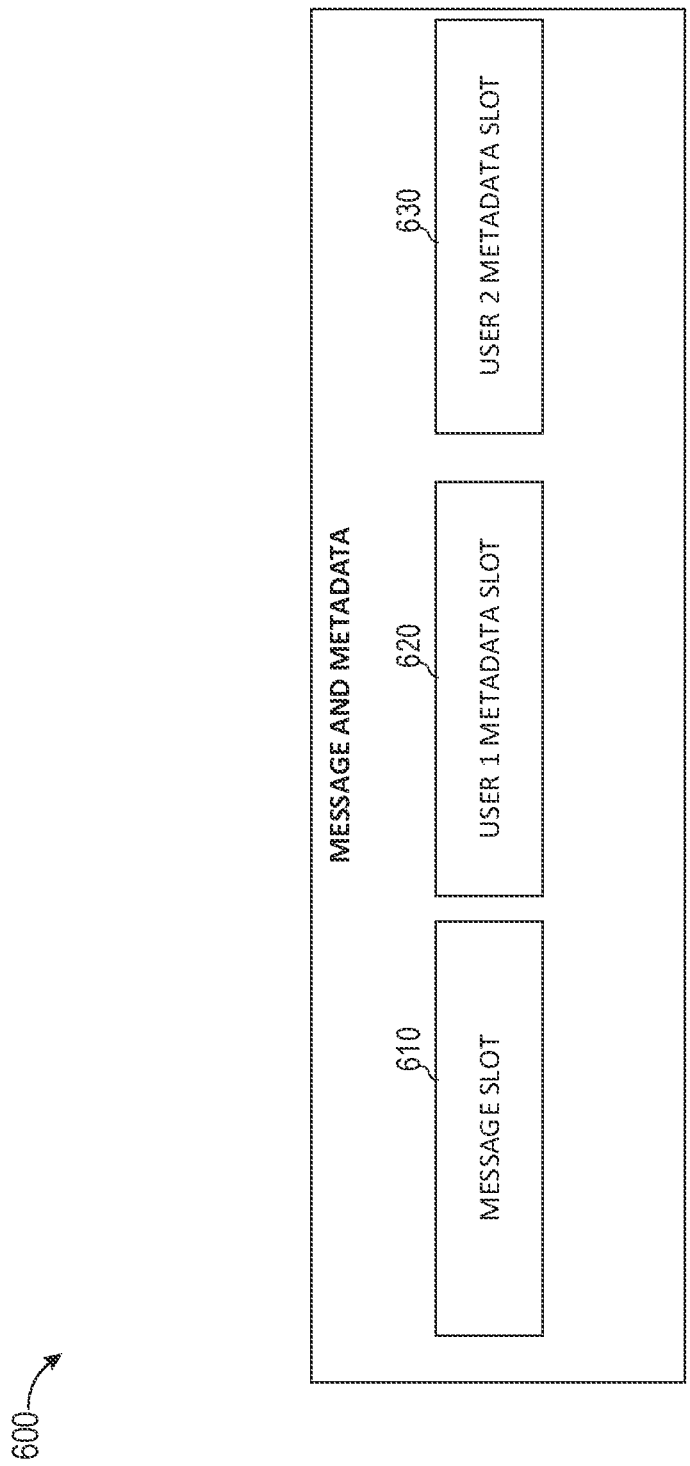
FIG. 6 is a diagram representing message and metadata slots of the metadata encryption system, in accordance with some examples.

FIG. 5 illustrates the metadata encryption system 230 according to some examples. The metadata encryption system 230 includes a communication session module 520, a metadata slot access module 530, and a message and metadata packet module 540. The communication session module 520 establishes a conversation session between a plurality of client devices of a plurality of participants and maintains a conversation state between the plurality of client devices.

As an example, to establish the communication session, the communication session module 520 generates a conversation encryption key. The communication session module 520 sends the conversation encryption key to the client devices. The communication session module 520 does not maintain access to the conversation encryption key after distributing the key to the client devices. The client devices can negotiate and generate a new conversation encryption key using secure communications based on the conversation encryption key generated by the communication session module 520. The client devices can then exchange messages via the communication session module 520 securely using the new conversation encryption key. In some examples, each client device can generate a pair of private and public encryption keys for securely exchanging metadata in the conversation session. For example, a first client device can generate a first public key for decrypting metadata and distributes the first public key to other client devices involved in the communication session. The first client device can encrypt metadata using a paired first private key and transmit the encrypted metadata together with encrypted message content in a metadata slot to recipient client devices. The recipient client devices can decrypt the metadata to read the metadata using the first public key and can decrypt the message content using the new conversation encryption key.

Specifically, after establishing the communication session, the communication session module 520 receives messages and metadata from client devices 102 of users in the conversation and stores such messages and metadata in encrypted form as part of the conversation state. The communication session module 520 sends updates to the client devices 102 to represent newly received messages and metadata in encrypted form. In an example, the communication session module 520 receives from a messaging client 104 a last update timestamp indicating the last time the messaging client 104 received an update to the conversation from the communication session module 520. The communication session module 520 searches for messages and metadata that have timestamps that follow the last update timestamp (e.g., messages and reactions that follow the previous time an update was sent to the messaging client 104) and transmits those messages and metadata that are part of the conversation to the messaging client 104 as part of synchronization data.

In one example, the communication session module 520 receives from a messaging client 104 a synchronization request. The communication session module 520 identifies a given timestamp representing a previous time the messaging client 104 synchronized with the communication session module 520 and retrieves timestamps of content stored by the server. The communication session module 520 identifies a set of timestamps that are later in time than the given timestamp and transmits the set of messages and one or more metadata to the messaging client 104 based on the set of timestamps. The messaging client 104 then presents the set of messages and one or more metadata as new messages and metadata to the user. In another example, the communication session module 520 automatically broadcasts updates to the conversation whenever the communication session module 520 receives a new message or metadata as part of the conversation. In this case, the messaging client 104 receives those updates and locally stores the messages and metadata for subsequent presentation to a user when input from a user is received to open the conversation.

Certain or all of the components shown in the metadata encryption system 230 can be implemented on a server and/or on respective client devices 102. In an example, a first client device involved in a communication session can receive input from a first participant that generates metadata (e.g., a reaction to a message exchanged in the conversation session). The first client device stores the metadata in a encrypted metadata slot 620 associated with the first participant. As part of storing the metadata, a metadata slot access module 530 of the first client device encrypts the metadata using a first private encryption key. The first client device can also receive input from the first participant that generates a message as part of the communication session. The first client device stores the message in an encrypted message slot 610 associated with the first participant. As part of storing the message, the first client device encrypts the message using either the first private encryption key or a conversation key associated with the communication session. The message and metadata packet module 540 of the first client device can generate a data packet 600 that includes both the encrypted message slot 610 and the encrypted metadata slot 620. The data packet 600 is sent to the messaging server 118 for distribution to other client device associated with the communication session.

Upon receiving the data packet 600 by a second client device associated with the communication session, the second client device can decrypt contents of the packet to present the message and metadata to a second participant. To do so, the metadata slot access module 530 of the second client device can read a packet header to determine that the received metadata corresponds to an encrypted metadata slot 620. In response, the metadata slot access module 530 of the second client device obtains from memory a first public key associated with the encrypted metadata slot 620. The metadata slot access module 530 of the second client device decrypts the encrypted metadata slot 620 to read the contents of the metadata and displays such contents as part of the communication session interface. In an example, the contents of the metadata can be displayed adjacent to the messages associated with the metadata or in a region of the display dedicated to displaying metadata associated with the first participant. The second participant can add metadata to the communication session in encrypted form using a second private key of the second participant in a metadata slot 630.

In another example, the first client device can receive a request from the first participant to access metadata corresponding to a second participant. In response, the metadata slot access module 530 of the first client device obtains from memory a second public key associated with a metadata slot 630 corresponding to the second participant. The metadata slot access module 530 of the first client device decrypts the metadata slot 630 to read the contents of the metadata obtained from the second participant and displays such contents as part of the communication session interface. In an example, the contents of the metadata can be displayed adjacent to the messages associated with the metadata or in a region of the display dedicated to displaying metadata associated with the second participant. In some examples, metadata associated with the encrypted metadata slot 620 (corresponding to metadata received from the first client device) is presented with a first visual indicator (color, font style, etc.) and metadata associated with the metadata slot 630 (corresponding to metadata received from the second client device) is presented with a second visual indicator (color, font style, etc.). This visually distinguishes the metadata associated with the encrypted metadata slot 620 from metadata associated with the metadata slot 630.

Figure 7:
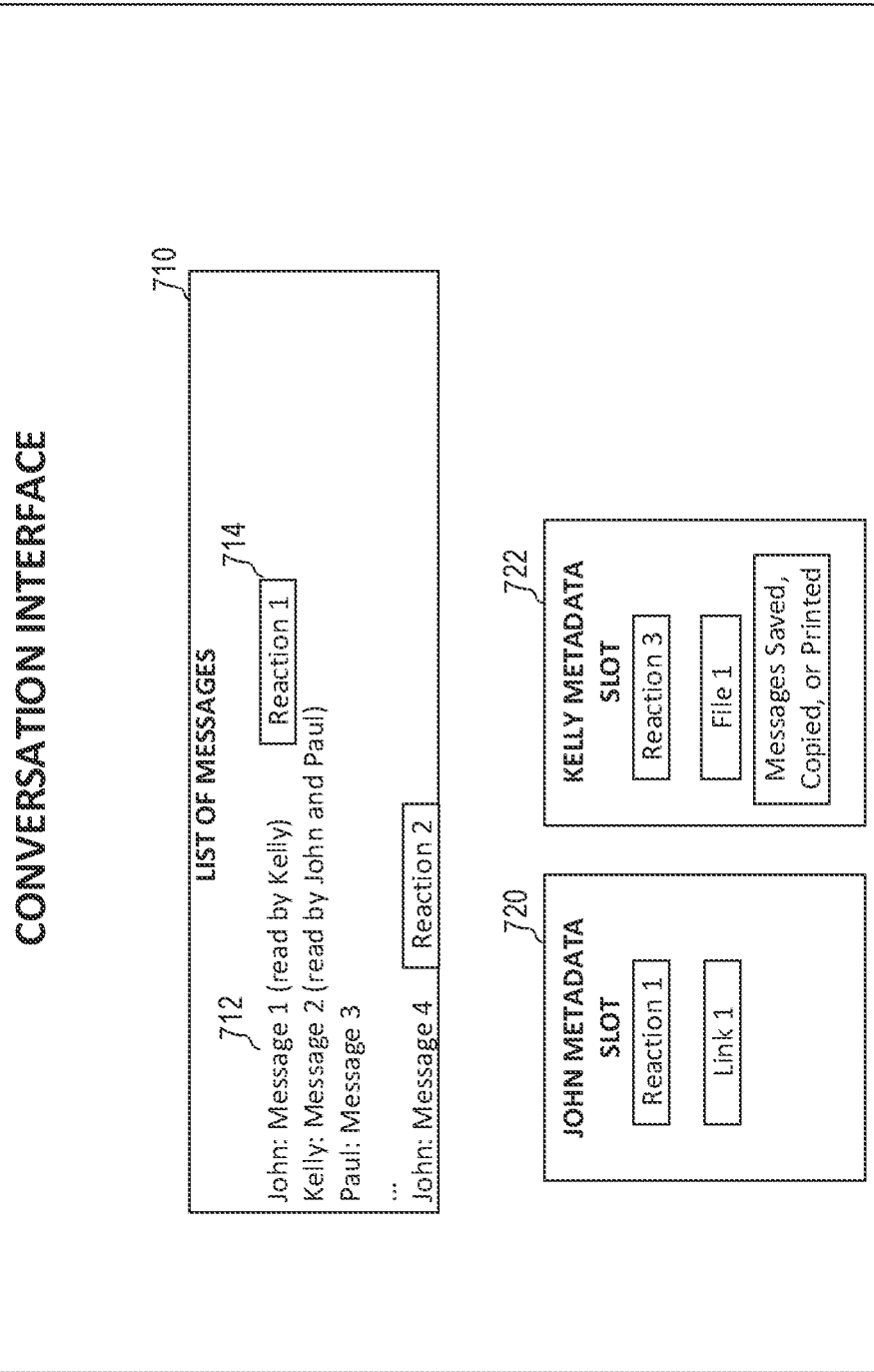
FIG. 7 is a diagram representing a graphical user interface of the metadata encryption system, in accordance with some examples.

FIG. 7 is a diagrammatic representation of a graphical user interface 700 of the metadata encryption system 230, in accordance with some examples. The graphical user interface 700 includes a conversation interface with a message region 710, a first metadata region 720 and a metadata region 722 (a second metadata region). The message region 710 includes a set of messages exchanged in a conversation (communication session) between a plurality of users (participants). The first metadata region 720 includes a list of metadata added or generated by a first user (e.g., received by a first client device) of the plurality of users and that is associated with the encrypted metadata slot 620. The metadata region 722 includes a list of metadata added or generated by a second user (e.g., received by a second client device) of the plurality of users and that is associated with the metadata slot 630.

The message region 710 includes a list of messages 712 exchanged by the participants in the communication session. The message region 710 can also include a first metadata 714 and a second metadata 716. Specifically, the metadata encryption system 230 may receive an update from a first user (e.g., John) that includes a first message. In response, the metadata encryption system 230 transmits the first message to second and third users (e.g., Kelly and Paul) using an end-to-end encryption process, such as by encrypting the first message with a conversation key. The metadata encryption system 230 can receive a first metadata 714 from the second user. In response, the metadata encryption system 230 encrypts the first metadata 714 using a private key of the second user and presents the first metadata 714 to the users including the first, second and third users by decrypting the first metadata 714 using a public key associated with the second user.

The client device 102 of the first user can receive input from the first user to open the conversation interface. In response, the client device 102 of the first user presents the first message and any other messages and metadata received as part of the conversation by decrypting such data using public keys associated with the metadata slots in which the metadata is stored and a conversation key of the communication session. The client device 102 of the first user can access metadata of the first metadata 714 from an encrypted metadata slot 620. In response, the client device 102 obtains a public key associated with the encrypted metadata slot 620 to decrypt the first metadata 714 and display the first metadata 714. The client device 102 is prevented from modifying the first metadata 714 because the client device 102 does not have the private key associated with the encrypted metadata slot 620 used for writing data to the encrypted metadata slot 620. The client device 102 can receive input from the first participant to add a message to the conversation session and generate metadata. The client device 102 in response adds metadata to the metadata slot 630 associated with the first user by encrypting such metadata using a second private encryption key of the first user. The client device 102 generates a data packet 600 that includes an encrypted message slot 610 and metadata slot 630 that includes metadata in encrypted form and the messages received from the first user.

In some examples, the first metadata region 720 presents a list of all of the metadata that were exchanged as part of the conversation and that were received from a first client device 102. The metadata region 722 presents a list of all of the metadata that were exchanged as part of the conversation and that were received from a second client device 102. The metadata presented in the first metadata region 720 and metadata region 722 can be provided in addition to or in alternative to presenting the metadata within the message region 710.

For example, the first metadata region 720 (e.g., a first metadata slot) can be provided for presenting or accessing metadata generated by and received from a first client device of a first participant. The metadata region 722 (e.g., a second metadata slot) can be provided for presenting or accessing metadata generated by and received from a second client device of a second participant. The metadata included in the first metadata region 720 can be encrypted by the first client device using a first private key and can be accessed or decrypted by any client device of any of the plurality of participants using a first public key that corresponds to the first private key. None of the plurality of participants except the first participant associated with the first client device can write, add, delete or modify the metadata included in the first metadata region 720 without having access to the first private key. The metadata included in the metadata region 722 can be encrypted by the second client device using a second private key and can be accessed or decrypted by any client device of any of the plurality of participants using a second public key that corresponds to the second private key. None of the plurality of participants except the second participant associated with the second client device can write, add, delete or modify the metadata included in the metadata region 722 without having access to the second private key. This allows each user to have a secure place in the conversation session to store metadata associated with the conversation and share such metadata with other participants in the conversation securely in an end-to-end encrypted manner.

The metadata presented in the first metadata region 720 and metadata region 722 can similarly be visually distinguished with visual indicators (e.g., using a first color and a second color) on the basis of whether the metadata is associated with an encrypted metadata slot 620 or a metadata slot 630.

Figure 8:
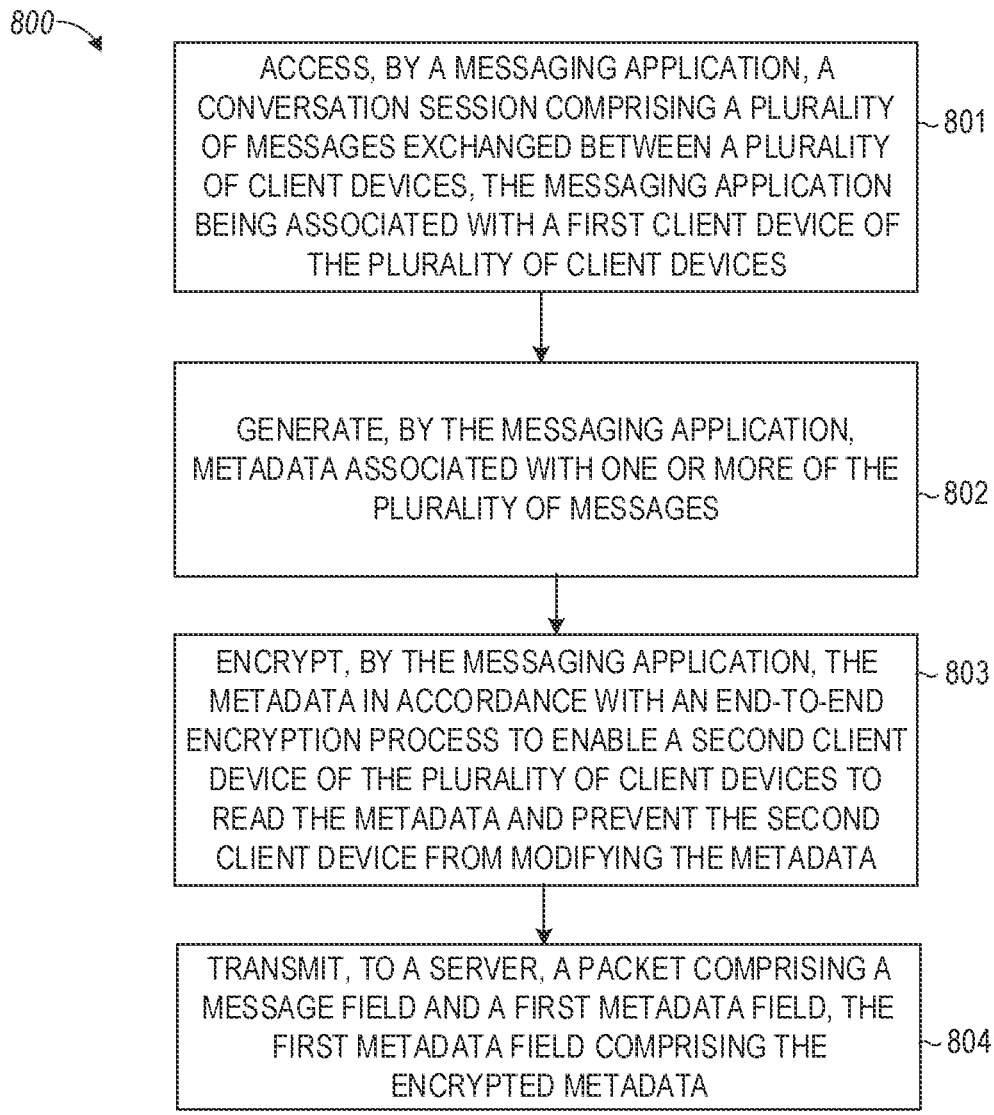
FIG. 8 is a flowchart illustrating example operations of the messaging application, according to example examples.

FIG. 8 is a flowchart illustrating example operations of the messaging client 104 in performing process 800, according to example examples. The performing process 800 may be embodied in computer-readable instructions for execution by one or more processors such that the operations of the performing process 800 may be performed in part or in whole by the functional components of the messaging server system 108; accordingly, the performing process 800 is described below by way of example with reference thereto. However, in other examples at least some of the operations of the performing process 800 may be deployed on various other hardware configurations. The operations in the performing process 800 can be performed in any order, in parallel, or may be entirely skipped and omitted.

At operation 801, the messaging client 104 accesses a conversation session comprising a plurality of messages exchanged between a plurality of client devices, the messaging application being associated with a first client device of the plurality of client devices, as discussed above.

At operation 802, the messaging client 104 generates metadata associated with one or more of the plurality of messages, as discussed above.

At operation 803, the messaging client 104 encrypts the metadata in accordance with an end-to-end encryption process to enable a second client device of the plurality of client devices to read the metadata and prevent the second client device from modifying the metadata, as discussed above.

At operation 804, the messaging client 104 transmits, to a server, a packet comprising an encrypted message slot and a first metadata slot, the first metadata slot comprising the encrypted metadata, as discussed above.

Machine Architecture

Figure 9:
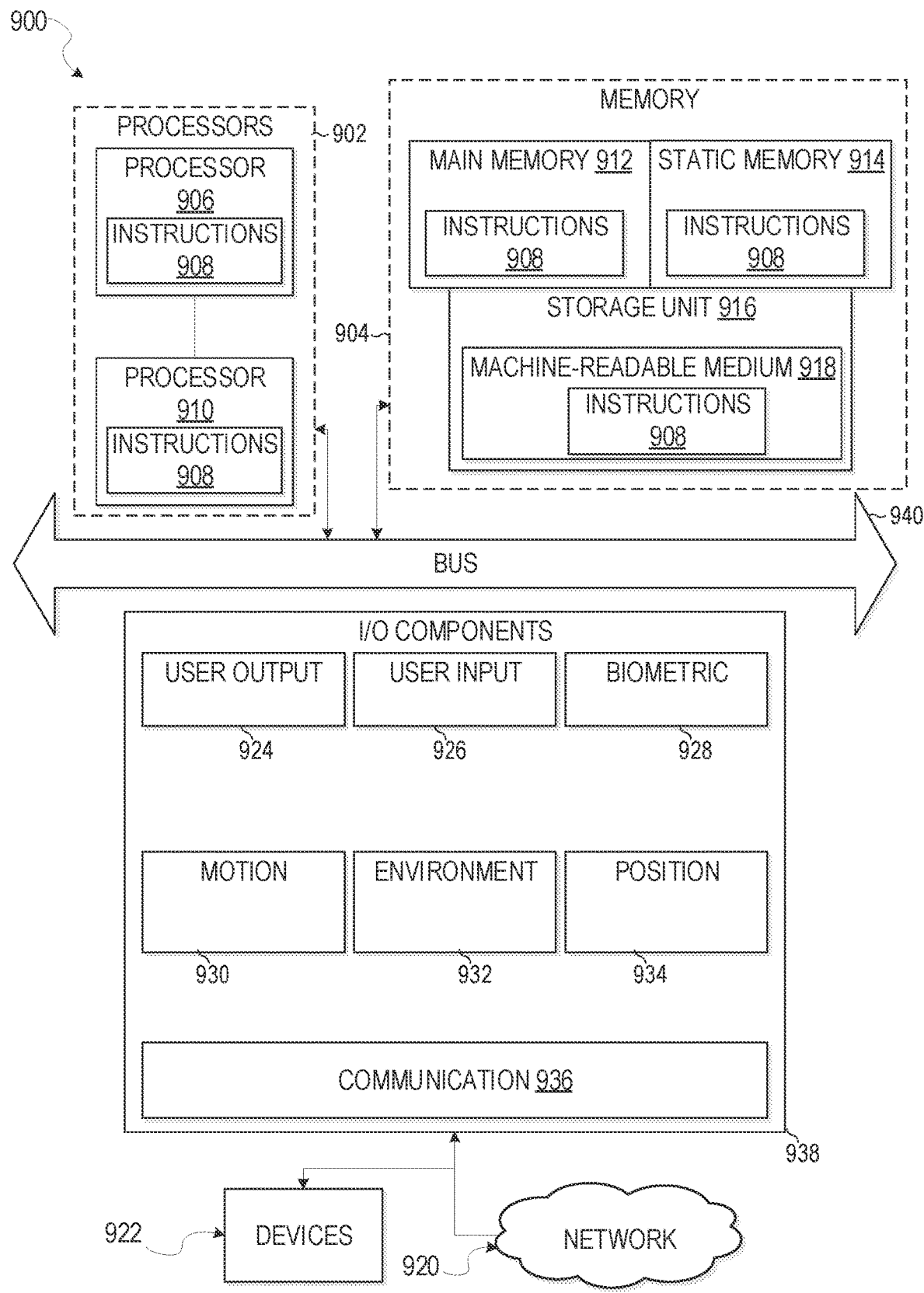
FIG. 9 is a diagram representing machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an apples, an app, or other executable code) for causing the machine 900 to perform any one or more of the methodologies discussed herein may be executed. For example, the instructions 908 may cause the machine 900 to execute any one or more of the methods described herein. The instructions 908 transform the general, machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include multiple processors 902, main memory 904, and input/output (I/O) components 938, which may be configured to communicate with each other via a bus 940. In an example, the multiple processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The main memory 904 includes a main memory 912, a static memory 914, and a storage unit 916, all accessible to the multiple processors 902 via the bus 940. The main memory 904, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the multiple processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components, one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta-rear camera configurations on the front and rear sides of the client device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth Low Energy), Wi-Fi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the multiple processors 902) and storage unit 916 may store one or more sets of instructions and data structures (e.g., software) embodying or used by any one or more of the methodologies or functions described herein. These instructions (e.g., the instructions 908), when executed by multiple processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Software Architecture

Figure 10:
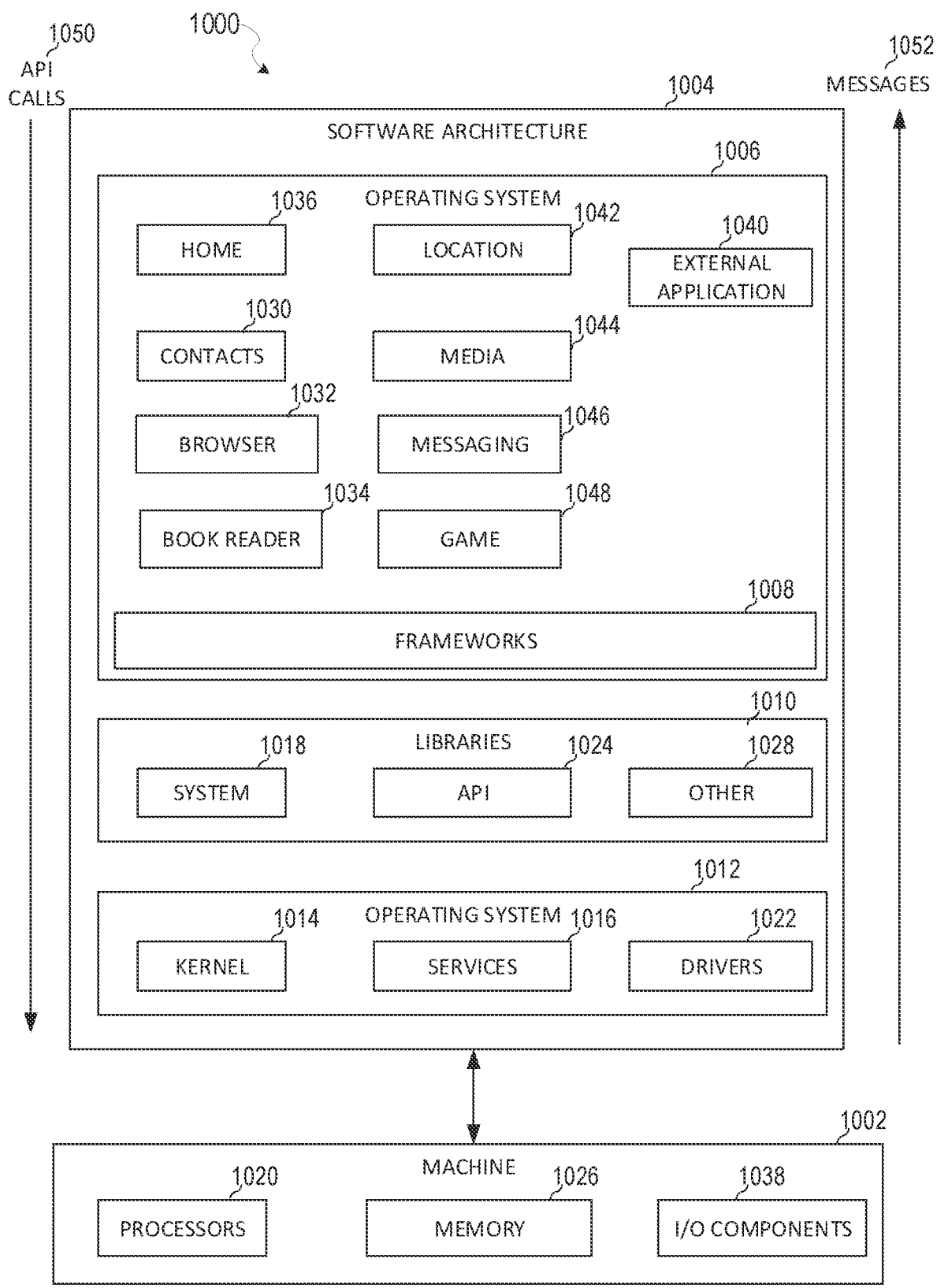
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functions. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications, such as an external app 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external app 1040 (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the external app 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, ail extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises, a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more multiple processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example examples, the processors or processor-implemented components may be located in a single geographic location (e.g., within a home environment, an office environment, or a server farm). In other example examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
   accessing, by a messaging application, a conversation session comprising a plurality of messages exchanged between a plurality of client devices, the messaging application being associated with a first client device of the plurality of client devices;
   generating, by the messaging application, metadata associated with one or more of the plurality of messages;
   encrypting, by the messaging application of the first client device, the metadata separately from the one or more of the plurality of messages, wherein the one or more of the plurality of messages are sent from the first client device to a second client device and are encrypted using a first key and the metadata is sent from the first client device to the second client device and is encrypted, separately from the first key, using a second key;
   causing the second client device of the plurality of client devices to decrypt the metadata sent from the first client device separately from decrypting the one or more of the plurality of messages sent from the first client device to read the metadata and prevent the second client device from modifying the metadata;
   transmitting, to a server, a packet comprising an encrypted message slot and a first metadata slot, the first metadata slot comprising the encrypted metadata; and
   generating for display on the second client device a graphical user interface comprising the plurality of messages, the graphical user interface comprising a message region, a first metadata region, and a second metadata region that are simultaneously displayed on the second client device, the plurality of messages exchanged between the plurality of client devices being presented in the message region that is in a separate portion of the graphical user interface than the first and second metadata regions, the message region also presenting a first list of metadata items and a second list of metadata items, the first list of metadata items, encrypted by the messaging application of the first client device, being displayed in the first metadata region while also being presented in the message region, and additional metadata comprising the second list of metadata items, encrypted by the second client device, being displayed in the second metadata region while also being presented in the message region, the first metadata region being dedicated to presenting the first list of metadata items and the second metadata region being dedicated to presenting the second list of metadata items.

2. The method of claim 1, wherein the server is prevented from decrypting the first metadata slot of the packet, each user of a plurality of users associated with respective ones of the plurality of client devices being assigned a separate metadata slot, wherein the metadata displayed in the first metadata region is presented using a first visual characteristic, and wherein the additional metadata displayed in the second metadata region is presented using a second visual characteristic.

3. The method of claim 1, wherein the metadata displayed in the first metadata region is presented in a first color different from a second color used to present the additional metadata displayed in the second metadata region, and wherein encrypting the metadata comprises:
   encrypting the metadata using a first private key associated with the first client device; and
   enabling the second client device to decrypt the metadata using a first public key associated with the first client device.

4. The method of claim 3, further comprising:
   causing the server to generate a conversation packet that includes a plurality of slots, wherein a first of the plurality of slots comprises the encrypted message slot and the first metadata slot of the packet received from the first client device, wherein a second of the plurality of slots comprises a second metadata slot received from a third client device of the plurality of client devices.

5. The method of claim 4, wherein the second metadata slot comprises metadata generated by the third client device and encrypted using a second private key associated with the third client device.

6. The method of claim 5, wherein the second client device decrypts the metadata in the second metadata slot using a second public key associated with the third client device.

7. The method of claim 3, wherein encrypting the metadata comprises:
   encrypting the metadata using a first private key associated with the first client device; and
   enabling the second client device to decrypt the metadata using a conversation key associated with the conversation session.

8. The method of claim 1, wherein the metadata comprises at least one of an indication of an augmented reality element.

9. The method of claim 1, further comprising:
encrypting the message slot using a first encryption key that is different from a second encryption key used to encrypt the first metadata slot.

10. The method of claim 1, wherein a first message of the plurality of messages is associated with a plurality of metadata slots, a first of the plurality of metadata slots corresponding to metadata generated by the messaging application of the first client device, a second of the plurality of metadata slots corresponding to the additional metadata generated by a second client device.

11. The method of claim 10, the first of the plurality of metadata slots being encrypted using a first encryption key that differs from a second encryption key used to encrypt the second of the plurality of metadata slots.

12. The method of claim 10, further comprising:
decrypting the second of the plurality of metadata slots to enable the messaging application to read contents of the second of the plurality of metadata slots and prevent the messaging application from modifying the contents of the second of the plurality of metadata slots.

13. The method of claim 12, wherein the messaging application decrypts the second of the plurality of metadata slots using a public key associated with the second client device and is prevented from re-encrypting the contents of the second of the plurality of metadata slots using the public key associated with the second client device.

14. The method of claim 1, further comprising establishing an end-to-end encryption process between the plurality of client devices by exchanging encryption keys, wherein the message region presents a first message together with a first metadata item generated by the messaging application associated with the first client device, wherein the message region presents a second message together with a second metadata item generated by the messaging application associated with the second client device, wherein the first metadata region presents the first metadata item while the first metadata item, the first message, the second metadata item, and the second message are also being presented in the message region, and wherein the second metadata region presents the second metadata item on the second client device while the second client device also presents the first metadata region including the first metadata item and the message region including the first message, the second message, the first metadata item and the second metadata item.

15. A system comprising:
at least one processor of a first client device configured to perform operations comprising:
accessing, by a messaging application, a conversation session comprising a plurality of messages exchanged between a plurality of client devices, the messaging application being associated with the first client device of the plurality of client devices;
generating, by the messaging application, metadata associated with one or more of the plurality of messages;
encrypting, by the messaging application of the first client device, the metadata separately from the one or more of the plurality of messages, wherein the one or more of the plurality of messages are sent from the first client device to a second client device and are encrypted using a first key and the metadata is sent from the first client device to the second client device and is encrypted, separately from the first key, using a second key;
causing the second client device of the plurality of client devices to decrypt the metadata sent from the first client device separately from decrypting the one or more of the plurality of messages sent from the first client device to read the metadata and prevent the second client device from modifying the metadata;
transmitting, to a server, a packet comprising an encrypted message slot and a first metadata slot, the first metadata slot comprising the encrypted metadata; and
generating for display on the second client device a graphical user interface comprising the plurality of messages, the graphical user interface comprising a message region, a first metadata region, and a second metadata region that are simultaneously displayed on the second client device, the plurality of messages exchanged between the plurality of client devices being presented in the message region that is in a separate portion of the graphical user interface than the first and second metadata regions, the message region also presenting a first list of metadata items and a second list of metadata items, the first list of metadata items, encrypted by the messaging application of the first client device, being displayed in the first metadata region while also being presented in the message region, and additional metadata comprising the second list of metadata items, encrypted by the second client device, being displayed in the second metadata region while also being presented in the message region, the first metadata region being dedicated to presenting the first list of metadata items and the second metadata region being dedicated to presenting the second list of metadata items.

16. The system of claim 15, the operations comprising:
determining that the first metadata region is associated with a first encrypted metadata slot associated with the first client device and that is associated with the first key;
presenting a first visual indicator for the first metadata region in response to determining that the first metadata region is associated with the first encrypted metadata slot;
determining that the second metadata region is associated with a second encrypted metadata slot associated with the second client device and that is associated with a third key; and
presenting a second visual indicator for the second metadata region in response to determining that the second metadata region is associated with the second encrypted metadata slot, the second visual indicator visually distinguishing the second metadata region from the first metadata region.

17. The system of claim 15, wherein encrypting the metadata comprises:
encrypting the metadata using a first private key associated with the first client device; and
enabling the second client device to decrypt the metadata using a first public key associated with the first client device.

18. The system of claim 17, wherein the operations further comprise:
causing the server to generate a conversation packet that includes a plurality of slots, wherein the first of the plurality of slots comprises the encrypted message slot and the first metadata slot of the packet received from the first client device, wherein a second of the plurality of slots comprises a second metadata slot received from a third client device of the plurality of client devices, wherein a third client device associated with the conversation session presents the graphical user interface comprising the plurality of messages together with the first and second metadata regions.

19. The system of claim 15, wherein one or more metadata items in the first list of metadata items comprises an emoji.

20. A non-transitory machine-readable storage medium that includes instructions that, when executed by one or more processors of a first client device, cause the first client device to perform operations comprising:
   accessing, by a messaging application, a conversation session comprising a plurality of messages exchanged between a plurality of client devices, the messaging application being associated with the first client device of the plurality of client devices;
   generating, by the messaging application, metadata associated with one or more of the plurality of messages;
   encrypting, by the messaging application of the first client device, the metadata separately from the one or more of the plurality of messages, wherein the one or more of the plurality of messages are sent from the first client device to a second client device and are encrypted using a first key and the metadata is sent from the first client device to the second client device and is encrypted, separately from the first key, using a second key;
   causing the second client device of the plurality of client devices to decrypt the metadata sent from the first client device separately from decrypting the one or more of the plurality of messages sent from the first client device to read the metadata and prevent the second client device from modifying the metadata;
   transmitting, to a server, a packet comprising an encrypted message slot and a first metadata slot, the first metadata slot comprising the encrypted metadata; and
   generating for display on the second client device a graphical user interface comprising the plurality of messages, the graphical user interface comprising a message region, a first metadata region, and a second metadata region that are simultaneously displayed on the second client device, the plurality of messages exchanged between the plurality of client devices being presented in the message region that is in a separate portion of the graphical user interface than the first and second metadata regions, the message region also presenting a first list of metadata items and a second list of metadata items, the first list of metadata items, encrypted by the messaging application of the first client device, being displayed in the first metadata region while also being presented in the message region, and additional metadata comprising the second list of metadata items while also being presented in the message region, encrypted by the second client device, being displayed in the second metadata region, the first metadata region being dedicated to presenting the first list of metadata items and the second metadata region being dedicated to presenting the second list of metadata items.

* * * * *